Patented May 6, 1952

2,595,499

UNITED STATES PATENT OFFICE 2,595,499

PROCESS FOR PRODUCTION OF VITAMIN $B_{12}$

Thomas R. Wood, Murray Hill, and David Hendlin, Elizabeth, N. J., assignors to Merck & Co., Inc., Rahway, N. J., a corporation of New Jersey No Drawing. Application July 10, 1948, Serial No. 38,176

12 Claims. (Cl. 195—114)

This invention is concerned generally with the production of therapeutically and nutritionally valuable substances by fermentation, and in particular to an improved method for the microbiological production of vitamin substances having growth-promoting properties for the microorganism *Lactobacillus lactis* Dorner. Also, it relates to an improved method for the microbiological production of vitamin $B_{12}$. Vitamin $B_{12}$ is a water-soluble, red-colored, crystalline compound derivable from liver and valuable in the treatment of certain types of human anemia, for instance pernicious anemia. It is further valuable as a nutritive factor for animals as described in detail in a co-pending application of one of the present applicants, Serial No. 38,175, filed July 10, 1948.

The vitamin substances, such as vitamin $B_{12}$, which are produced utilizing our improved process, are conveniently assayed utilizing the growth response of th emicro-organism *Lactobacillus lactis* Dorner under the assay conditions described by Shorb (J. Biol. Chem. 169, 455–6). The potencies of these vitamin substances and of fermented broths and concentrates enriched therewith are expressed in terms of LLD activity on the basis of an arbitrary liver standard, said standard having a potency of 1,000 LLD units per milligram. It has been determined that pure crystalline vitamine $B_{12}$ has an LLD activity of about 11,000,000 LLD units/mg. A brief description of the assay method which we employed is given below.

*Lactobacillus lactis* Dorner has been reported to require two growth factors, TJ and LLD. Medium modifications incorporated in the formula described below, have eliminated the requirement for the TJ factor, and the assay as presented is specific for LLD. This microorganism shows LLD factor response to vitamine $B_{12}$. Pure crystalline vitamin $B_{12}$ is used as the assay standard and all unknowns are evaluated in terms of microbiological growth-promoting activity, equivalent to the microbiological activity of vitamin $B_{12}$.

The organism, *Lactobacillus lactis* Dorner, A. T. C. C., 10, 697, used in this assay method is available in the American Type Culture Collection. Stock cultures of the organism are maintained on a growth medium which consists of:

1% Difco yeast extract
0.02% tomato juice serum
1% anhydrous dextrose
1.5% agar

The medium used for the inoculum consists of the basal or assay medium to which 1 unit per cc. of vitamin $B_{12}$ is added. The inoculum cells are washed with sterile distilled water and diluted to form a suspension which reads between 90% and 95% light transmission on the Evelyn photometer with a 520 mu filter.

The composition of the assay medium, double strength, is listed below. Ingredients may be conveniently dispensed from stock solutions:

| | | |
|---|---|---|
| DL isoleucine | mg | 200 |
| DL alpha-ananine | mg | 200 |
| DL aspartic acid | mg | 200 |
| DL valine | mg | 200 |
| DL methionine | mg | 200 |
| DL glutamic acid | mg | 200 |
| DL threonine | mg | 200 |
| DL serine | mg | 200 |
| DL phenylalanine | mg | 200 |
| DL leucine | mg | 200 |
| L histidine | mg | 200 |
| DL tryptophane | mg | 400 |
| L arginine | mg | 200 |
| L lysine | mg | 100 |
| Aminoacetic acid | mg | 200 |
| L cystine | mg | 200 |
| DL norleucine | mg | 200 |
| L tyrosine | mg | 200 |
| Dextrose | gm | 10 |
| Sodium acetate | gm | 6 |
| Fumaric acid | gm | 0.5 |
| Sodium ethyloxalacetate | gm | 0.5 |
| Riboflavin | mcg | 200 |
| Calcium pantothenate | mcg | 200 |
| Thiamin HCl | mcg | 200 |
| Nicotinic acid | mcg | 200 |
| Pyridoxamine | mcg | 400 |
| Para-aminobenzoic acid | mcg | 40 |
| Biotin | mcg | 0.4 |
| $MgSO_4 \cdot 7H_2O$ | mg | 200 |
| NaCl | mg | 10 |
| $FeSO_4 \cdot 7H_2O$ | mg | 10 |
| $MnSO_4 \cdot 4H_2O$ | mg | 10 |
| $K_2HPO_4$ | mg | 500 |
| $KH_2PO_4$ | mg | 500 |
| Folic acid | mcg | 2 |
| Casein hydrolyzate | gm | 1.0 |
| Water to | cc | 500 |

The basal medium is prepared by combining the amino acids, then adding dextrose, sodium acetate, fumaric acid, heating to dissolve, and immediately readjusting to pH 7. The sodium ethyloxalacetate and vitamins are then added, dissolved, and the solutions again adjusted to pH 7. Finally, the salts, folic acid and casein hydrolyzates are added, dissolved, and the pH adjusted to 6.6.

A water solution or suspension of the sample to be assayed is diluted so that the solution contains about 0.2 LLD type units per cc. which is then added to the assay tubes in 0.5, 1.0, 1.5, 2.0 and 2.5 cc. amounts. All of the tubes are then adjusted to a volume of 2.5 cc. with water, 2.5 cc. of the basal medium added, and the tubes are finally plugged and sterilized by heating at 120° C. for 13 minutes. After cooling to room temperature, the tubes are inoculated with one drop of the standardized suspension of L. lactis and then incubated at 37° C. for 40 hours. After incubation, the tubes are titrated directly with 0.05 N sodium hydroxide to the blue green end-point of bromthymol blue.

The activity of the sample may then be determined from the standard curve by the amount of sodium hydroxide required.

The standard curve is prepared with crystalline vitamin $B_{12}$. One milligram of pure crystalline $B_{12}$ contains $11 \times 10^6$ units. A stock solution is diluted and 0.0, 0.05, 0.1, 0.2, 0.3, 0.4, 0.6, 0.8, 1.0 and 2.0 units added to duplicate series of tubes. Water is added to adjust the volume to 2.5 cc. The procedure described above for the samples under assay is followed with the standard. Typical titration values for the standard series listed above are 1.5, 2.0, 2.7, 4.3, 5.7, 6.6, 7.5, 7.9, 8.0 and 8.4 respectively, in terms of milliliters of 0.05 N sodium hydroxide required to neutralize the acid produced per culture of L. lactis.

Vitamin substances having LLD activity are produced by fermentation of nutrient mediums by selected strains of various species of the subphylum Fungi. The potency of broths resulting from the fermentation of ordinary nutrient mediums by such organisms, however, is extremely small in comparison with the potencies of pure vitamin $B_{12}$. Such products vary in their content of LLD active substances, depending upon the species of fungus employed, but ordinarily contain LLD activity equivalent to a vitamin $B_{12}$ content of the order of 0.00003 mg./ml. It is extremely difficult to separate pure vitamin $B_{12}$, or LLD active concentrates of high activity, from the large amounts of impurities present in such mediums. It has, therefore, been of great importance to find a way of increasing the LLD potency of the fermented broth and at the same time to increase the concentration of LLD active substances relative to the total broth solids.

It is now discovered that these objects can be achieved by propagating strains of Fungi which produce substances having LLD activity, in aqueous nutrient mediums containing added cobalt. It has been found that, when these Fungi are cultivated in the presence of added cobalt, greatly increased quantities of LLD active substances are produced by the micro-organism. This results in a final broth of greatly increased LLD activity and also results in a great increase in the concentration of vitamin $B_{12}$ relative to the total broth solids. This increased microbiological yield of LLD active material not only facilitates isolation of pure vitamin $B_{12}$ from the fermented broth, but also makes feasible the use of the solid content of the broth as a feed supplement for animals.

It is particularly surprising that the addition of cobalt can stimulate increased microbiological production of LLD active substances, such as vitamin $B_{12}$, since cobalt is known to be extremely toxic to many micro-organisms. We have found that, at higher concentrations, cobalt is in fact also toxic to those strains of Fungi which produce substances having LLD activity. For example, an amount of cobalt (as cobalt nitrate) in excess of 10 to 20 parts per million based on the medium actually inhibits the production of LLD active substances by the fungus, Streptomyces griseus.

The quantity of cobalt present during the fermentation can be varied depending upon the medium used but we ordinarily prefer to employ an amount of cobalt between about 0.1 and 20 parts per million parts of medium. In some cases it may be desirable to use larger or smaller quantities of cobalt depending on the toxicity of the cobalt for the particular fungus employed. In the case of Streptomyces griseus, we have prepared fermentation broths of high LLD activity and have secured excellent yields of crystalline vitamin $B_{12}$ by cultivating the micro-organism in mediums containing approximately two parts per million of cobalt (as cobalt nitrate).

The cobalt may be added in metallic form, but is ordinarily added in the form of a cobalt compound, preferably a cobalt salt such as cobalt nitrate, or in the form of a naturally-occurring cobalt salt or complex such as may be present in microbial nutrients rich in cobalt. In view of the inconvenience of providing the desired amount of cobalt by adding such naturally-occurring nutrient materials, we prefer to add the cobalt in the form of a cobalt salt.

In carrying out the present invention, we may employ nutrient mediums ordinarily utilized in the propagation of Fungi. The production of LLD activity by a given fungus may, it is true, vary depending on the nutrient medium employed, but it has been found that, for any given type of medium deficient in cobalt the addition of small amounts of cobalt invariably results in a large increase in the yield of LLD active substances.

The usual nutrients include a source of assimilable carbon, a source of assimilable nitrogen, inorganic salts and growth factors when required. The carbon can be provided by a carbohydrate such as dextrose, maltose, xylose, invert sugar, corn syrup, and the like. The nitrogen can be provided by an ammonium salt, amino acids or proteins, such as soy beans, oats, yeast, yeast extracts, tryptic digest of casein, meat extract, blood meal, protein meat and bone scrap, salmon meal, fish meals, fish solubles, distillers' solubles, and the like. If desired, the Fungi can be propagated using proteins (or amino acids), without any carbohydrate being present in the medium, in which case the proteins (or amino acids) serve as the source of both the carbon and nitrogen required by the micro-organism.

The micro-organisms, selected strains of which we consider suitable for our fermentation, utilizing aqueous nutrient mediums containing added cobalt, are members of the Fungi, as defined on pages 1 and 2 of the book "An Introduction to Industrial Mycology" by Smith and Raistrick (London, Edward Arnold and Co., third edition, 1946), that is, Myxomycetes, Schizomycetes and Eumycetes. Especially suitable are Schizomycetes and particularly certain strains of the species Streptomyces griseus which may be used also for the production of the antibiotics streptomycin and grisein. Other species of Streptomyces, such as Streptomyces albidoflavus, Streptomyces colombiensis nov. sp., Streptomyces roseochromogenus and Streptomyces antibioticus include strains which produce high yields of LLD active substances. Other suitable Schizomycetes are members of the genus Clostridium, and we have found that selected strains of the following species produce LLD active substances under the fermentation conditions of our process: *Clostridium tetanomorphum, Clostridium cochclearium, Clostridium flabelliferum,* and *Clostridium butyricum.* Other microorganisms among the Fungi which we have found similarly to produce LLD activity are Torula, *Eremothecium ashbyii* and *Escherichia coli.* We wish to emphasize, however, that for any given species of fungus, it is necessary to select strains which produce substances having LLD activity. Our invention is neither limited to any particular fungus, nor does it include every strain of any given fungus. On the other hand, every micro-organism yet tried that will produce substances having LLD activity will produce said LLD active substances in greatly increased yield when propagated in an aqueous nutrient medium containing an optimal concentration of cobalt.

The medium is sterilized and the sterile medium containing the desired amount of cobalt is inoculated with a culture of the selected fungus and the mixture is incubated until the optimal LLD activity is attained. The fermentation is ordinarily conducted for a period of about two to seven days, although shorter or longer times may be employed if desired. The incubation is usually carried out under submerged conditions and at a temperature appropriate for the specific fungus employed.

The vitamin $B_{12}$ can be isolated from the fermentation mixture in crystalline form, if desired, by filtering the fermentation broth and treating the filtered broth with activated charcoal, thereby adsorbing the vitamin $B_{12}$. The activated charcoal is eluted with an aqueous solution of α-picoline and the resulting eluate is evaporated to dryness. The solid concentrate is extracted with a lower aliphatic alcohol, such as methyl alcohol, and the alcoholic extract is passed through a column packed with activated alumina whereby the vitamin $B_{12}$ is adsorbed by the alumina. The column is then developed with fresh lower aliphatic alcohol solvent and those fractions of the eluate which show vitamin $B_{12}$ activity (as determined by microbiological assay) are combined and the combined eluates are concentrated. The concentrated alcoholic solution is then mixed with a liquid miscible with said solution and in which the active substance is insoluble, such as acetone. The precipitate which forms is purified by reprecipitation from alcohol by the addition of acetone and the product is further purified by crystallization from water by the addition of acetone to produce crystalline vitamin $B_{12}$.

The following examples illustrate methods of carrying out the present invention, but it is to be understood that these examples are given by way of illustration and not of limitation.

Example 1

Mediums containing 2% dried yeast suspended in distilled water and varying amounts of cobalt (as cobalt nitrate) as indicated in the following table were prepared and subdivided into 250 ml. Erlenmeyer flasks containing 40 ml. per flask. After sterilizing the flasks and their contents at 120° C. for one-half hour, the flasks were inoculated with about 2.5% by volume of a 48 hour vegetative culture of *Streptomyces griseus* 25G (a grisein-producing strain) grown on meat extract-tryptic digest of a casein medium. After inoculation, the inoculated broths were maintained at 28° C. for 4 days during which time they were shaken continuously on a rotary shaking machine. After the completion of this fermentation period, the activities of the broths, as determined by assay with *Lactobacillus lactis* Dorner, were as follows:

| Cobalt, p. p. m. | LLD Units per ml. of fermented broth |
|---|---|
| 0 | 300 |
| 1 | 2,760 |
| 2 | 3,000 |
| 10 | 4,600 |
| 20 | 3,000 |

Example 2

A medium was prepared containing the following:

| | | |
|---|---|---|
| Protein meat and bone scrap | percent | 8 |
| Sodium chloride | do | 0.5 |
| $FeSO_4.H_2O$ | p. p. m. | 1550 |
| Distilled water to make a total of | percent | 100 |

This medium was prepared, sterilized, inoculated and incubated as described in Example 1. A second portion of the same medium supplemented with 2 p. p. m. of cobalt (which was added as cobalt nitrate) was similarly sterilized, inoculated and incubated. At the end of the fermentation period the broths assayed as follows:

No cobalt—160 LLD units/ml.
Cobalt, 2 p. p. m.—590 LLD units/ml.

Example 3

Fermentation mediums are prepared containing the following:

| | |
|---|---|
| Tryptic digest of casein | 1% |
| Meat extract | 0.3% |
| Sodium chloride | 0.5% |
| $FeSO_4.7H_2O$ | 50 p. p. m. |
| Soy bean oil | 0.15% (as anti-foam) |
| Tap water to make a total of | 100% |

The above medium is prepared in a 3000 gallon fermentor and sterilized. The medium is inoculated with 275 gallons of vegetative inoculum of a grisein producing strain of *Streptomyces griseus* designated as 25G, and the mixture incubated at 28° C. for 48 hours under agitated, submerged, aerated conditions.

The fermented broth is assayed using *Lactobacillus lactis* Dorner as the test organism and the broth is then treated to recover the crystalline vitamin $B_{12}$. This is accomplished by filtering the broth and adsorbing the active material therein by means of activated charcoal. The charcoal adsorbate is eluted with an equous solution of pyridine and the resulting eluate evaporated to dryness under reduced pressure. The solid concentrate thus obtained is extracted with methyl alcohol and the alcoholic extract is then adsorbed columnwise using activated alumina, and the active material eluted therefrom by means of fresh methyl alcohol. Those fractions showing most pronounced microbiological activity are concentrated together and the concentrated solution is then mixed with acetone whereupon crude vitamin $B_{12}$ precipitates and is recovered. This product is purified by reprecipitation from ethanol solution by the addition of acetone. This product is further purified by crystallization from water-acetone to produce crystalline vitamin $B_{12}$.

The following results were obtained on duplicate runs showing the effect of cobalt, which was added as cobalt nitrate:

| Run No. | Cobalt, p. p. m. | Broth Potency, LLD units/ml. | Crystalline Vitamin $B_{12}$ Isolated |
|---|---|---|---|
| | | | Mg. |
| 1 | None | 173 | 18.4 |
| 2 | 2 | 2,250 (average) | 106.7 |

Example 4

A fermentation medium was prepared containing the following:

| | Per cent |
|---|---|
| Soy bean meal (Staley 4-S) | 3 |
| Dextrose | 2 |
| NaCl | 0.25 |
| Distillers' solubles | 0.75 |
| Water to make a total of | 100 |

This medium was prepared and subdivided into 250 ml. Erlenmeyer flasks containing 40 ml. per flask. Varying amounts of cobalt (as cobalt nitrate) were added as indicated in the table below and the flasks and their contents sterilized by heating at 120° C. for one-half hour. The flasks were inoculated with about 2.5% by volume of a 48 hour vegetative culture of a streptomycin producing strain of *streptomyces griseus*. After inoculation, the inoculated broths were maintained at 27° C. for 3 days during which time they were shaken continuously on a rotary shaking machine. After the completion of this fermentation period the streptomycin and LLD activities of the broths assayed as follows:

| Co, p. p. m. | Streptomycin, γ/ml. | LLD units/ml. |
|---|---|---|
| 0.0 | 850 | 300 |
| 0.5 | 825 | 3,000 |
| 1.0 | 845 | 3,100 |
| 2.0 | 650 | 4,200 |
| 4.0 | 235 | 5,000 |
| 6.0 | <150 | 2,400 |
| 8.0 | <150 | 2,000 |
| 12.0 | <150 | 220 |

Example 5

A medium was prepared containing the following:

| | | |
|---|---|---|
| Brain-heart infusion | g | 18.5 |
| Agar | g | 1.85 |
| Water | ml | 495 |
| pH | | 7.0–7.2 |

This medium was prepared and subdivided into 125 ml. Erlenmeyer flasks containing 100 ml. of medium per flask. The flasks and contents were sterilized by heating for 25 minutes at 120° C. The mediums were cooled to 37° C. and inoculated with 1 ml. per flask of a suspension of *Clostridium tetanomorphum* grown anaerobically on Bacto brain-liver-heart medium. After inoculation, the inoculated broths were maintained under stationary conditions at 37° C. for a period indicated in the table below.

A second group of flasks containing the same medium supplemented with 10 micrograms of cobalt nitrate hexahydrate per ml. (approximately 2 parts of cobalt per million parts of medium) were similarly sterilized, inoculated and incubated. At the end of the fermentation period the broths assayed as follows: (The values given were obtained by averaging values obtained on four different fermentations carried out under each of the indicated conditions.)

| Fermentation Period, Days | LLD activity per ml. | |
|---|---|---|
| | No Cobalt | Cobalt, 2 p. p. m. |
| 4 | 660 | 4,600 |
| 7 | 760 | 6,300 |

Various changes and modifications may be made in carrying out the present invention without departing from the spirit and scope thereof, for instance, solid nutrient mediums such as grain brans may be employed instead of the aqueous nutrient mediums specified. Insofar as these changes and modifications are within the purview of the annexed claims, they are to be considered as part of our invention.

We claim:

1. A process for the production of vitamin $B_{12}$ which comprises fermenting, under submerged, aerated conditions, an aqueous nutrient medium containing cobalt equivalent to approximately from 0.1 to 2 parts per million parts of medium, when added as cobalt nitrate, by means of a vitamin $B_{12}$ producing strain of *Streptomyces griseus*.

2. In a bacteriological process for synthesizing vitamin $B_{12}$, the step of adjusting the cobalt content of the nutrient medium, by the addition of cobalt, to an amount of cobalt equivalent to about 0.1 to 2 parts per million of the nutrient medium.

3. In a bacteriological process for synthesizing LLD active substances, the step of adjusting the cobalt content of the nutrient medium, by the addition of cobalt, to an amount of cobalt equivalent to about 0.1 to 20 parts per million of the nutrient medium.

4. In a bacteriological process for synthesizing vitamin $B_{12}$, utilizing a vitamin $B_{12}$-producing strain of Streptomyces, the step of adjusting the cobalt content of the nutrient medium, by the addition of cobalt nitrate, to an amount of cobalt equivalent to about 0.1 to 2 parts per million of the nutrient medium.

5. In a microbiological process for producing vitamin substances having LLD activity, utilizing a vitamin $B_{12}$-producing microorganism, the improvement which comprises adjusting the cobalt content of the fermentation medium, by the addition of cobalt, to a substantially non-toxic amount of cobalt in excess of about 0.1 part per million of said medium.

6. In a microbiological process for synthesizing LLD-active substances, utilizing an LLD-activity-producing strain of Streptomyces, the step of adjusting the cobalt content of the nutrient medium, by the addition of cobalt, to an amount of cobalt equivalent to about 0.1 to 20 parts per million of the nutrient medium.

7. In a microbiological process for synthesizing vitamin $B_{12}$, utilizing a vitamin $B_{12}$-producing strain of Streptomyces, the step of adjusting the cobalt content of the nutrient medium, by the addition of cobalt, to an amount of cobalt equivalent to about 0.1 to 20 parts per million of the nutrient medium.

8. In a microbiological process for synthesizing vitamin $B_{12}$, utilizing a vitamin $B_{12}$-synthesizing strain of *Streptomyces griseus*, the step of adjusting the cobalt content of the nutrient medium, by the addition of cobalt, to an amount of cobalt equivalent to about 0.1 to 20 parts per million of the nutrient medium.

9. In a bacteriological process for synthesizing vitamin $B_{12}$, the steps of adjusting the cobalt content of the nutrient medium, by the addition of cobalt, to an amount of cobalt equivalent to about 0.1 to 2 parts per million of the nutrient medium, and recovering vitamin $B_{12}$ from the fermented medium.

10. In a bacteriological process for synthesizing LLD-active substances, the steps of adjusting the cobalt content of the nutrient medium, by the addition of cobalt, to an amount of cobalt equivalent to about 0.1 to 20 parts per million of the nutrient medium, and recovering said substances from the fermented medium.

11. In a microbiological process for producing vitamin substances having LLD activity, utilizing a vitamin $B_{12}$-producing microorganism, the improvement which comprises adjusting the cobalt content of the fermentation medium, by the addition of cobalt, to a substantially non-toxic amount of cobalt in excess of about 0.1 part per million of said medium, and recovering said substances from the fermented medium.

12. In a microbiological process for synthesizing vitamin $B_{12}$, utilizing a vitamin $B_{12}$-producing strain of Streptomyces, the steps of adjusting the cobalt content of the nutrient medium, by the addition of cobalt, to an amount of cobalt equivalent to about 0.1 to 20 parts per million of the nutrient medium, and recovering vitamin $B_{12}$ from the fermented medium.

THOMAS R. WOOD.
DAVID HENDLIN.

REFERENCES CITED

The following references are of record in the file of this patent:

UNITED STATES PATENTS

| Number | Name | Date |
| --- | --- | --- |
| 2,098,200 | Stiles | Nov. 2, 1937 |
| 2,182,989 | Jean | Dec. 12, 1939 |
| 2,326,425 | Arzberger | Aug. 10, 1943 |
| 2,363,227 | Burkholder | Nov. 21, 1944 |
| 2,368,074 | Walton | Jan. 23, 1945 |
| 2,447,814 | Novak | Aug. 24, 1948 |
| 2,449,140 | Pollard | Sept. 14, 1948 |
| 2,449,340 | Tanner | Sept. 14, 1948 |
| 2,450,710 | Bird et al. | Oct. 5, 1948 |

OTHER REFERENCES

Annual Review of Biochemistry, vol. VIII (1939), pp. 572–3.

Annual Review of Biochemistry, vol. X (1941), p. 460.

Annual Review of Biochemistry, vol. XII (1943), p 262.

Annual Review of Biochemistry, vol. XV (1946), p. 435.

Annual Review of Biochemistry, vol. XVI (1947), p. 523.

Porter: Bacterial Chemistry and Physiology, 1946, John Wiley & Sons, Inc., pp. 621 and 629.

Thornberry et al.: Arch. Biochem., 16, 1948, pp. 393–394.

Smith: Nature, April 24, 1948, vol. 161, pages 638, 639.

Science, 107, April 1948, pp. 396 to 400.